(12) United States Patent
Voser

(10) Patent No.: US 12,398,249 B2
(45) Date of Patent: Aug. 26, 2025

(54) SEALING ELEMENT AND/OR SUPPORT RING MADE OF COMPRESSED CARBON-FIBER-REINFORCED COMPOSITE MATERIAL

(71) Applicant: BURCKHARDT COMPRESSION AG, Winterthur (CH)

(72) Inventor: Alexandre Voser, Elsau (CH)

(73) Assignee: BURCKHARDT COMPRESSION AG, Winterthur (CH)

( * ) Notice: Subject to any disclaimer, the term of this patent is extended or adjusted under 35 U.S.C. 154(b) by 800 days.

(21) Appl. No.: 17/640,167

(22) PCT Filed: Sep. 6, 2020

(86) PCT No.: PCT/EP2020/074885
§ 371 (c)(1),
(2) Date: Mar. 3, 2022

(87) PCT Pub. No.: WO2021/044046
PCT Pub. Date: Mar. 11, 2021

(65) Prior Publication Data
US 2022/0332905 A1    Oct. 20, 2022

(30) Foreign Application Priority Data
Sep. 6, 2019  (EP) ..................... 19196064

(51) Int. Cl.
*C08J 5/04* (2006.01)
*C09J 161/16* (2006.01)
*C08K 3/04* (2006.01)
*C08K 7/06* (2006.01)

(52) U.S. Cl.
CPC ............ *C08J 5/042* (2013.01); *C09J 161/16* (2013.01); *C08J 2361/16* (2013.01); *C08K 3/04* (2013.01); *C08K 7/06* (2013.01)

(58) Field of Classification Search
CPC ...... C08J 5/042; C08J 2300/22; C08J 2371/00; C08J 2327/18; C08J 2377/00; C08J 2379/08; C08J 2381/02; C09K 3/10; C09K 2003/1096
See application file for complete search history.

(56) References Cited

U.S. PATENT DOCUMENTS

| | | |
|---|---|---|
| 7,011,111 B2 | 3/2006 | Spiegl et al. |
| 2003/0085533 A1 | 5/2003 | Spiegl et al. |
| 2010/0291388 A1 | 11/2010 | Alvarez et al. |
| 2013/0189478 A1 | 7/2013 | Fisher, Jr. et al. |

FOREIGN PATENT DOCUMENTS

| | | | |
|---|---|---|---|
| EP | 0297702 A2 | 1/1989 | |
| EP | 181396 B2 | 10/1992 | |
| EP | 0916477 B2 | 5/2008 | |
| JP | 2007145934 A | 6/2007 | |
| JP | 2010095613 A | 4/2010 | |
| WO | WO-8504887 A1 * | 11/1985 | ............... C08J 3/21 |

OTHER PUBLICATIONS

International Search Report for PCT/EP2020/074885, prepared by the European Patent Office, mailing date Nov. 25, 2020, 3 pages.
NitPro Composites, Blog, CarbonFiber versus Graphite: Everything you need to Know, retrieved from the Internet, Feb. 20, 2025, https://www.nitprocomposites.com/blog/carbon-fiber-vs-graphite-every-thing-you-need-to-know, Dated Aug. 22, 2023, 6 pages.

* cited by examiner

*Primary Examiner* — Catherine S Branch
*Assistant Examiner* — Olga Lucia Donahue
(74) *Attorney, Agent, or Firm* — Brooks Kushman P.C.

(57) ABSTRACT

The present invention relates to a sealing element and/or a support ring, in particular for a reciprocating compressor, manufactured by compression molding of a mixture of chips of carbon fiber-reinforced composite material, wherein at least part of the chips contains carbon fibers having a length of 3 to 20 mm, and wherein the carbon fibers in the sealing element and/or support ring have a random fiber orientation.

20 Claims, No Drawings

SEALING ELEMENT AND/OR SUPPORT RING MADE OF COMPRESSED CARBON-FIBER-REINFORCED COMPOSITE MATERIAL

CROSS-REFERENCE TO RELATED APPLICATION

This application is the U.S. national phase of PCT Application No. PCT/EP2020/074885 filed on Sep. 6, 2020, which claims priority to EP patent application Ser. No. 19/196,064.0 filed on Sep. 6, 2019, the disclosures of which are incorporated in their entirety by reference herein.

The present invention relates to a sealing element and/or a support ring, in particular for a reciprocating compressor, manufactured by compression molding of a mixture of chips of carbon fiber-reinforced composite material, a method for manufacturing such a sealing element and/or support ring, and a reciprocating compressor which contains at least one such sealing element and/or support ring.

Sealing elements, such as piston or packing rings, guide rings, such as piston guide rings, and guide seals, such as piston guide rings, must meet a wide range of requirements in order to fulfill their task. In particular, they must have suitable hardness, sufficiently high tensile strength, sufficiently high elongation at break, good conformability, high aging resistance, low pressure creep and cold flow tendency, excellent chemical resistance, excellent temperature resistance and—depending on the application—possibly high ozone resistance. For example, good conformability is required to ensure the sealing element will function even if it moves. In addition, a low tendency to pressure creep and cold flow are essential to prevent irreversible plastic deformation in the cold state under load, even after long periods of operation.

Due to their good properties, sealing elements are often made from compositions based on polytetrafluoroethylene (PTFE). PTFE is characterized, for example, by an exceptionally wide thermal application range, almost universal chemical resistance and excellent resistance to light, weathering and hot water vapor. In addition, PTFE is characterized by very good sliding properties, excellent anti-adhesive behavior, good electrical properties and good dielectric properties. To reduce cold flow and improve mechanical properties, however, PTFE is generally not used in its pure form but reinforced with fillers. For example, carbon, graphite, molybdenum disulfide or bronze particles are used as fillers. More recently, fiber-reinforced composites with a PTFE matrix in which fibers such as glass fibers, carbon fibers or aramid fibers are embedded have been increasingly used for this purpose. However, such PTFE-based materials are limited to applications of sealing elements or support rings in the lower pressure range due to their limited mechanical stability. For applications at higher pressures, corresponding materials based on high-performance polymers are used, such as polyimide, polyaryletherketone, polyphenylene sulfide or polyetheretherketone (PEEK). For example, carbon fiber-reinforced plastics (CFRP), such as those with a matrix of PEEK in which 10% by weight of carbon fibers are embedded, are used for this purpose.

Usually, sealing elements and support rings made of such carbon fiber-reinforced plastics are produced by injection molding, using carbon short fibers typically with a maximum length of 1 mm. Such short fibers have the advantage that they align themselves to the contour of the component to be manufactured and do not protrude from the surface of the manufactured component. It is also known to produce such components by sintering from a granulate in which short fibers with a fiber length of about 0.1 mm are typically used. The granules are sintered under pressure with the fibers inside the manufactured component. However, a disadvantage of the sealing elements and support rings produced in this way is their strength, which requires improvement, their comparatively low tightness and their excessively high and inhomogeneous thermal expansion.

Based on this, the present invention was based on the object of providing a sealing element or a support ring which has increased strength, is characterized by higher tightness, improved low and particularly homogeneous thermal expansion and is particularly suitable for use in a reciprocating compressor.

According to the invention, this object is solved by a sealing element and/or support ring, in particular for a reciprocating compressor, manufactured by compression molding of a mixture of chips of carbon fiber-reinforced composite material, at least some of the chips containing carbon fibers having a length of 3 to 20 mm, preferably the carbon fibers in the sealing element and/or support ring having a random fiber orientation.

This solution is based on the surprising finding that such a sealing element and/or support ring manufactured by compression molding of a mixture of chips of carbon fiber-reinforced composite material, at least some of the chips containing carbon fibers with a length of 3 to 20 mm, not only exhibits increased strength but is characterized in particular by higher tightness, improved low and particularly homogeneous thermal expansion. In compression molding, the chips of carbon fiber-reinforced composite are introduced into the cavity of a mold and then the cavity is heated and closed using a plunger, as a result of which the molding compound is pressed into the shape specified by the cavity. As the small chips are poured into the cavity, they arrange themselves randomly, resulting in a random fiber orientation in the finished component, i.e. carbon fibers pointing in all directions are contained in the finished component. As a result, sealing elements and support rings with at least largely isotropic properties are obtained. In particular, the sealing elements and support rings according to the invention are characterized by a comparatively homogeneous thermal expansion, the thermal expansion in the pressing direction being slightly higher than in the transverse direction thereto. In addition, the sealing elements and support rings according to the invention are characterized by a very low thermal expansion, particularly in the direction transverse to the pressing direction, which is in the range of that of steel. In the pressing direction, the thermal expansion corresponds to that of the plastic forming the matrix of the carbon fiber-reinforced composite. Due to the low thermal expansion, only a small clearance is required between sealing elements or support rings and the component to be sealed or supported, such as between the piston rod and support ring, resulting in constant, narrow gaps. This also reduces the risk of local heating during operation and thus of jamming. The material expands less when heated, whereas conventional support rings swell when heated and as a result contact the piston rod, causing friction between the support ring and piston rod and mutual heating. The mechanical properties of the sealing elements and support rings according to the invention are also relatively homogeneous. Furthermore, the sealing elements and support rings according to the invention are characterized by a higher tightness. It is therefore possible to lap suitably manufactured valve plates, which results in a very fine surface. The plates are also very impact resistant, are very temperature resistant, have a low temperature coefficient and are lightweight. Finally, it was unexpected that the carbon fibers, despite their comparatively long length of 3 to 20 mm, do not protrude from the sealing element or support ring and, as a result, rub against another component, such as a piston rod. On the contrary, it has been shown in the context of the present invention that the carbon fibers crumble at their ends when these protrude from the component. For all these reasons, the sealing element or support ring according to the invention is particularly suitable for use in a piston compressor.

According to the invention, the carbon fibers in the sealing element and/or support ring have a random fiber orientation in at least two dimensions and preferably in all three dimensions. That is, the properties imparted by the fibers are isotropic or largely isotropic in at least two dimensions and preferably in all three dimensions.

According to the invention, the sealing element or the support ring is made from chips of carbon fiber-reinforced composite material, at least some of the chips containing carbon fibers with a length of 3 to 20 mm. If the length of the carbon fibers is less than 3 mm, the advantages of the present invention, such as increased strength and low and homogeneous thermal expansion, are no longer obtained to the desired extent. Insofar as the carbon fibers are longer than 20 mm, the compression molding no longer results in a sufficiently high fiber random orientation in the component, so that homogeneity of the properties is not achieved to a desired extent.

According to the invention, at least a part of the chips contains carbon fibers with a length of 3 to 20 mm. In order to achieve the abovementioned advantages of the present invention to a high degree, it is proposed in further development of the invention that at least 50%, further preferably at least 60% or 70%, particularly preferably at least 80% and very particularly preferably at least 90% of the chips used in compression molding have carbon fibers with a length of 3 to 20 mm.

Most preferably, all the chips used in compression molding contain carbon fibers with a length of 3 to 20 mm.

In addition to carbon fibers with a length of 3 to 20 mm, the chips may also contain carbon fibers with a different length. However, it is preferred that in each chip containing carbon fibers with a length of 3 to 20 mm, at least 50%, further preferred at least 60% or 70%, particularly preferred at least 80% and very particularly preferred at least 90% of the carbon fibers contained have a length of 3 to 20 mm. Further preferably, all the carbon fibers of each chip containing carbon fibers having a length of 3 to 20 mm have a length of 3 to 20 mm.

Most preferably, all the chips used in compression molding have exclusively carbon fibers with a length of 3 to 20 mm. For the purposes of the present invention, this is understood to mean that each of the carbon fibers contained in the chips has a length of between 3 and 20 mm, although the length of all the fibers need not necessarily be the same, provided that each carbon fiber has a length of between 3 and 20 mm. A chip containing first carbon fibers each having a length of 5 mm, second carbon fibers each having a length of 10 mm and third carbon fibers each having a length of 15 mm is thus a chip containing exclusively carbon fibers having a length of 3 to 20 mm.

In all the above embodiments, it is particularly preferred if the chips, which contain carbon fibers having a length of 3 to 20 mm, contain carbon fibers having a length of 3 to 10 mm.

In order to obtain a good random orientation when filling the mold used for compression molding, it is proposed, in further development of the idea of the invention, to use chips that are not too large. In particular, good results are obtained with chips which are at least substantially plate-shaped with an at least substantially square or rectangular cross-section and have a length of 3 to 20 mm, a width of between 1 and 10 mm and a thickness of 1 to 5 mm. Consequently, it is preferred if at least 50%, more preferably at least 60% or 70%, particularly preferably at least 80% and most preferably at least 90% and most preferably all of the chips used in the compression molding have a length of 3 to 20 mm, a width of between 1 and 10 mm and a thickness of 1 to 0.5 mm. In particular, it is preferred that the chips have a length of 3 to 10 mm.

Preferably, the carbon fibers in the individual chips are arranged at least substantially parallel to each other. For the purposes of the present patent application, an at least substantially parallel arrangement of the carbon fibers in the individual chips means that the longitudinal fiber axes of at least 80% of the carbon fibers deviate by no more than 20° from all other longitudinal fiber axes of the at least 80% of the carbon fibers of a chip. Preferably, this applies to at least 90%, more preferably to at least 95% and most preferably to all the carbon fibers of a chip. Most preferably, the longitudinal axes of the fibers deviate from one another by no more than 10°, further preferably by no more than 5°, particularly preferably by no more than 2° and most preferably by no more than 1°. Most preferably, all carbon fibers of a chip are parallel to each other.

Such a parallel or at least substantially parallel arrangement of the carbon fibers in the individual chips can preferably be achieved by first providing at least one tape of carbon fiber-reinforced composite material, the carbon fibers in the at least one tape being arranged parallel or at least substantially parallel, before the at least one tape is cut transversely to the carbon fiber direction into chips each having a length of 3 to 20 mm. Thus, the parallelism of the carbon fibers of the tape is maintained in the chips produced therefrom.

Sealing elements or support rings with good properties are obtained in particular if the chips, which contain carbon fibers having a length of 3 to 20 mm, contain 20 to 70% by weight of carbon fibers, preferably 40 to 70% by weight of carbon fibers, and particularly preferably 60 to 70% by weight of carbon fibers, such as about 65% by weight of carbon fibers, with the remainder to 100% by weight being at least one thermoplastic.

The matrix material is selected depending on the exact properties desired. Suitable examples of the matrix material of the chips and in particular of the chips containing carbon fibers with a length of 3 to 20 mm are thermoplastics selected from the group consisting of polyphenylene sulfides, perfluoroalkoxy polymers, polyetheretherketones, polytetrafluoroethylenes, polyimides, polyamides and any mixtures of two or more of the aforementioned thermoplastics.

According to a very particularly preferred embodiment, at least the chips containing carbon fibers with a length of 3 to 20 mm contain one or more polyetheretherketone(s) as thermoplastic.

Particularly good results are obtained with chips containing carbon fibers having a length of 3 to 20 mm, which contain 20 to 70% by weight of carbon fibers, preferably 40 to 70% by weight of carbon fibers, and particularly preferably 60% to 70% by weight of carbon fibers, such as about 65% by weight of carbon fibers, with the remainder to 100% by weight being one or more polyetheretherketone(s).

In furtherance of the invention, it is proposed that the sealing element and/or the support ring is obtainable or obtained by a method comprising the following steps:
(i) providing at least one tape of carbon fiber-reinforced composite material, wherein the carbon fibers are arranged at least substantially parallel in the at least one tape,
ii) cutting the at least one tape transverse to the carbon fiber direction into chips each having a length of 3 to 20 mm,
iii) Placing the chips in a mold,
iv) heating the chips in the mold and
v) compacting the chips in the mold.

Preferably, in step ii), the at least one tape is cut into chips each having a width of 1 to 10 mm, the width of the chips being smaller than their length.

In order to obtain sealing elements or support rings with particularly homogeneous properties, it is preferred to introduce the chips into the mold in a random orientation in step iii).

Depending on the plastic used, the chips in step iii) are preferably heated to a temperature of 120 to 450° C. and particularly preferably to a temperature of 320 to 450° C.

Good results, especially in terms of thermal expansion and tightness, are obtained in particular when the chips are compressed at a pressure of 0.1 to 30 MPa in step iv).

The sealing elements and support rings according to the invention are particularly suitable as a support ring for a sealing packing, as a sealing ring, as a valve ring, as a valve plate or as a poppet of a poppet valve.

Another object of the present invention is a reciprocating compressor, which includes a sealing element as described above and/or a support ring as described above.

The invention claimed is:

1. A sealing element and/or support ring manufactured by compression molding of a mixture of chips of carbon fiber-reinforced composite material, at least some of the chips containing carbon fibers having a length of 3 to 20 mm, and the carbon fibers in the sealing element and/or support ring having a random fiber orientation in all three directions.

2. The sealing element and/or support ring according to claim 1, wherein the chips containing carbon fibers with a length of 3 to 20 mm do not contain fibers with a length other than the carbon fibers with a length of 3 to 20 mm.

3. The sealing element and/or support ring according to claim 1, wherein at least 50% of the chips contain carbon fibers with a length of 3 to 20 mm.

4. The sealing element and/or support ring according to claim 3, wherein at least 80% of the chips contain carbon fibers with a length of 3 to 20 mm.

5. The sealing element and/or support ring according to claim 3, wherein all chips contain carbon fibers with a length of 3 to 20 mm.

6. The sealing element and/or support ring according to claim 1, wherein the carbon fibers in the individual chips are arranged at least substantially parallel to one another.

7. The sealing element and/or support ring according to claim 1, wherein the chips, which contain carbon fibers having a length of 3 to 20 mm, comprise 20 to 70% by weight of carbon fibers, with the remainder to 100% by weight being at least one thermoplastic.

8. The sealing element and/or support ring according to claim 7, wherein the chips, which contain carbon fibers having a length of 3 to 20 mm, comprise 60 to 70% by weight of carbon fibers, with the remainder to 100% by weight being at least one thermoplastic.

9. The sealing element and/or support ring according to claim 1, wherein the chips, which contain carbon fibers with a length of 3 to 20 mm, contain carbon fibers with a length of 3 to 10 mm.

10. The sealing element and/or support ring according to claim 1, wherein the chips, which contain carbon fibers having a length of 3 to 20 mm, comprise at least one thermoplastic selected from the group consisting of polyphenylene sulfides, perfluoroalkoxy polymers, polyetheretherketones, polytetrafluoroethylenes, polyimides, polyamides and any mixtures of two or more of the aforementioned thermoplastics.

11. The sealing element and/or support ring according to claim 1, wherein the chips, which contain carbon fibers with a length of 3 to 20 mm, contain one or more polyetheretherketone(s) as thermoplastic.

12. The sealing element and/or support ring according to claim 1, wherein said sealing element and/or said support ring is obtained by a method comprising the following steps:
i) Providing at least one tape of carbon fiber-reinforced composite material, wherein the carbon fibers are arranged at least substantially parallel in the at least one tape,
ii) Cutting the at least one tape transverse to the carbon fiber direction into chips each having a length of 3 to 20 mm,
iii) Placing the chips in a mold,
iv) Heating the chips in the mold, and
v) Compacting the chips in the mold.

13. The sealing element and/or support ring according to claim 12, wherein the at least one tape is cut in step ii) into chips each having a width of 1 to 10 mm, the width of the chips being smaller than their length.

14. The sealing element and/or support ring according to claim 12, wherein the chips are introduced into the mold in a random orientation in step iii).

15. The sealing element and/or support ring according to claim 12, wherein the chips are heated in step iii) to a temperature of 120 to 450° C.

16. The sealing element and/or support ring according to claim 12, wherein the chips are compressed in step iv) with a pressure of 0.1 to 30 MPa.

17. The sealing element and/or support ring according to claim 12, wherein the chips are heated in step iii) to a temperature of 320 to 450° C.

18. The sealing element and/or support ring according to claim 1, wherein said sealing element and/or support ring is a support ring for a sealing packing, a sealing ring, a valve ring, a valve plate or a poppet of a poppet valve.

19. Piston compressor comprising at least one sealing element and/or support ring according to claim 1.

20. The sealing element and/or support ring according to claim 1, wherein said sealing element and/or support ring is configured for a reciprocating compressor.

* * * * *